May 8, 1923.
J. J. KOVAR ET AL
POTATO DIGGER
Filed Jan. 5, 1920
1,454,175
3 Sheets-Sheet 2
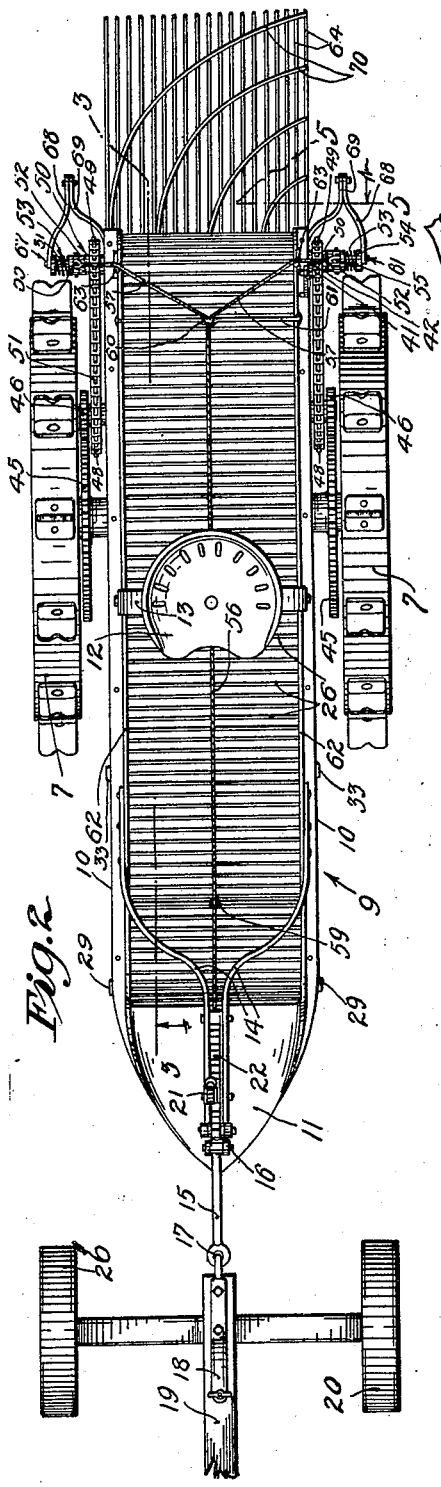
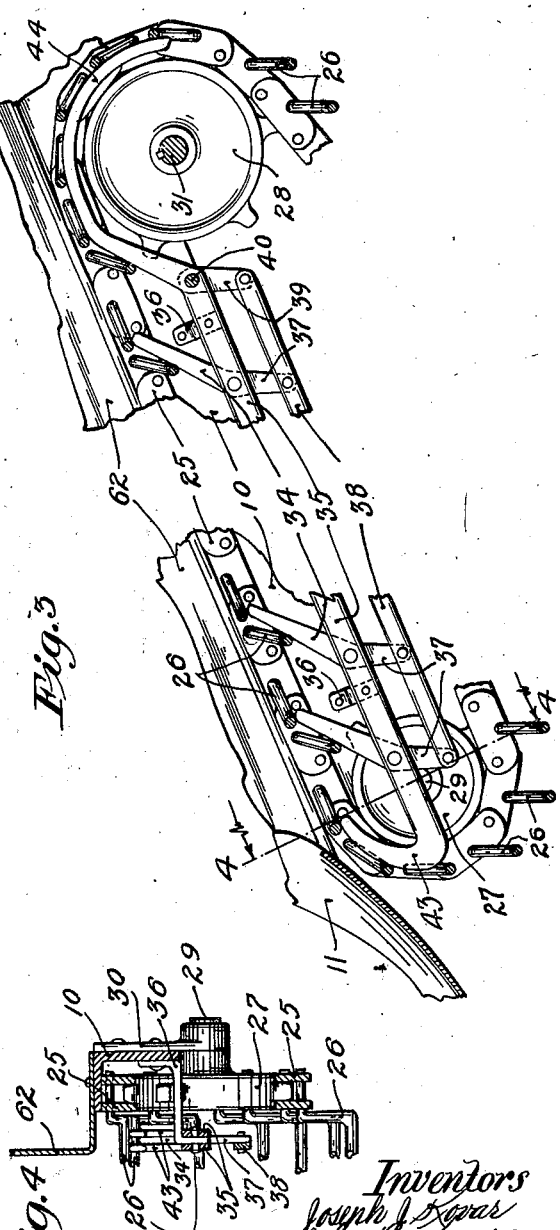

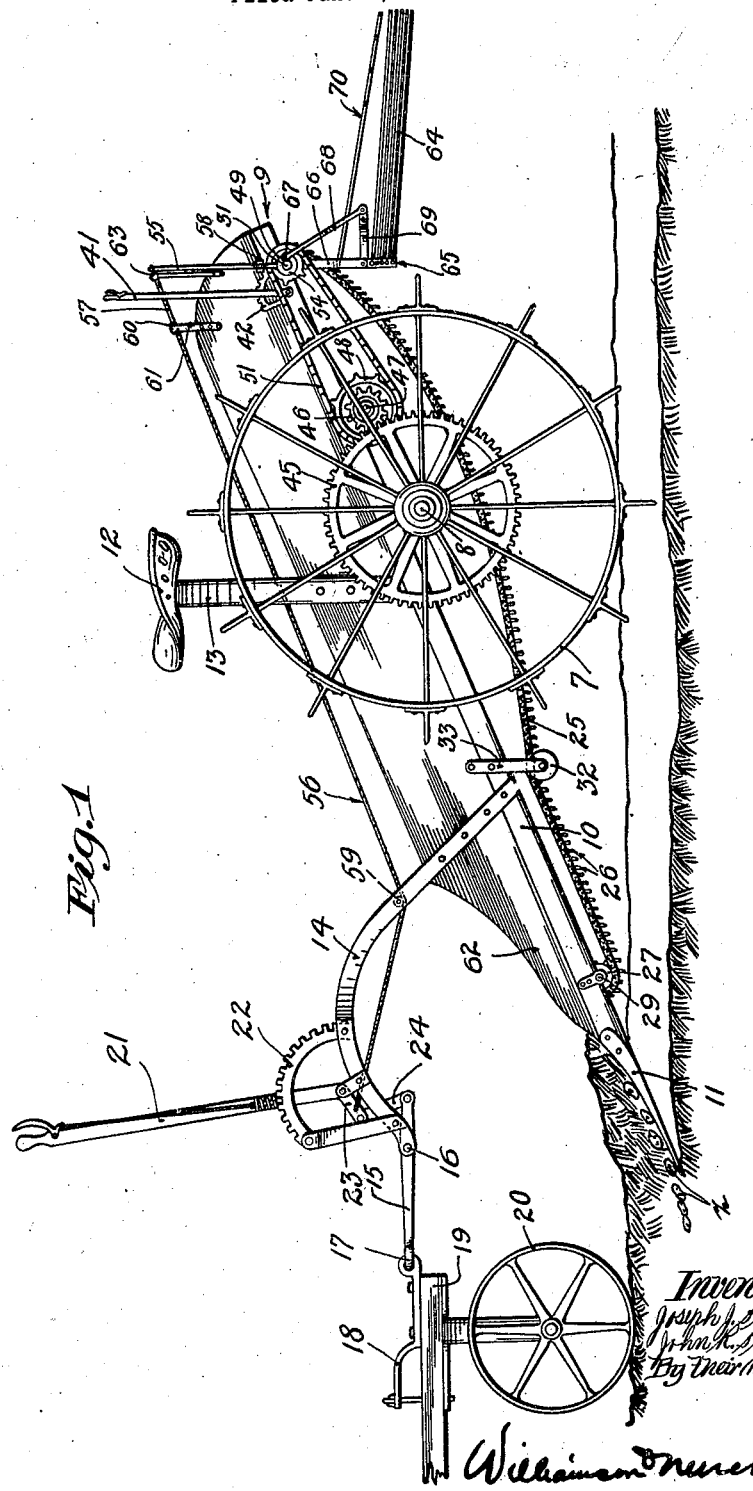

May 8, 1923.
J. J. KOVAR ET AL
POTATO DIGGER
Filed Jan. 5, 1920
1,454,175
3 Sheets-Sheet 3
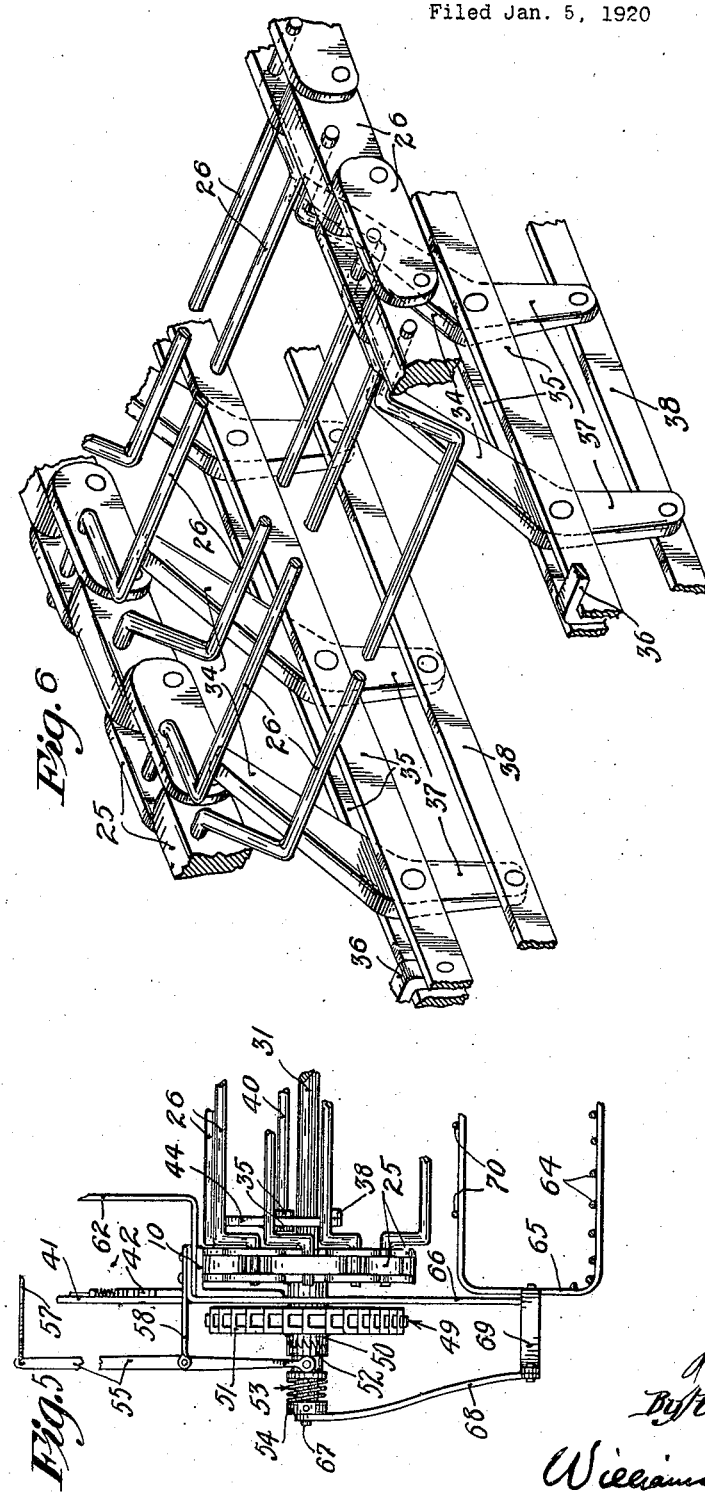
Inventors
Joseph J. Kovar
John R. Kovar
By their Attorneys Patented May 8, 1923.

1,454,175

UNITED STATES PATENT OFFICE.

JOSEPH J. KOVAR AND JOHN R. KOVAR, OF OWATONNA, MINNESOTA; SAID JOSEPH J. KOVAR ASSIGNOR TO SAID JOHN R. KOVAR.

POTATO DIGGER.

Application filed January 5, 1920. Serial No. 349,390.

*To all whom it may concern:*

Be it known that we, JOSEPH J. KOVAR and JOHN R. KOVAR, citizens of the United States, residing at Owatonna, in the county of Steele and State of Minnesota, have invented certain new and useful Improvements in Potato Diggers; and we do hereby declare the following to be a full, clear, and exact description of the invention, such as will enable others skilled in the art to which it appertains to make and use the same.

Our invention has for its object to provide a simple and highly efficient machine for digging potatoes and the like, and, to this end, it consists of the novel devices and combinations of devices hereinafter described and defined in the claims.

In the accompanying drawings, which illustrate the invention, like characters indicate like parts throughout the several views.

Referring to the drawings:—

Fig. 1 is a left side elevation of the improved machine;

Fig. 2 is a plan view of the same;

Fig. 3 is a fragmentary detail view with some parts sectioned on the line 3—3 of Fig. 2 on an enlarged scale;

Fig. 4 is a fragmentary detail view in transverse section taken on the line 4—4 of Fig. 3;

Fig. 5 is a fragmentary detail view partly in rear end elevation and partly in transverse section taken on the line 5—5 of Fig. 2, on an enlarged scale; and Fig. 6 is a fragmentary perspective view, on an enlarged scale, of the conveyor and cams for agitating its crank rods.

The numeral 7 indicates a pair of traction wheels loosely journaled on a fixed axle 8 on which is supported and secured, rearward of its longitudinal center, a skeleton frame 9. The sides of the frame are in the form of angle bars 10, the horizontal flanges of which are turned inward and the vertical flanges of which are turned downward.

A shovel plow 11 is rigidly secured to the front end of the frame 9, and a seat 12, for an operator, is secured to the transverse portion of a yoke 13, which, in turn, is rigidly secured to the frame side bars 10 formed of the axle 8. Also secured to the frame side bars 10 is a beam 14 made up of a pair of flat bars which extend upwardly and forwardly, and the forward ends of which are brought relatively close together and into parallel arangement to receive therebetween a draft bar 15. This draft bar 15 is pivoted at 16 to the beam 14, rearward of its longitudinal center, for vertical swinging movement, and the forward end of which is flexibly connected by interlocking eyes 17 to a clevis 18 rigidly secured to the rear end of a draft pole 19 supported on a truck 20.

The shovel plow 11 is raised and lowered to lift the same out of the ground or cause the same to enter the ground at various different depths by a latch lever 21 pivoted to the beam 14 and a co-operating lock segment 22 rigidly secured to said beam. Integrally formed with the lower end of the latch lever 21 is a short forwardly projecting arm 23, which is pivotally connected by a link 24 to the short or rear end of the draft bar 15. Obviously, by a forward movement of the latch lever 21, the shovel plow 11 will be lowered and, by a rearward movement, said lever will raise the shovel plow.

The dirt and potatoes Z, taken up by the shovel plow 11, are delivered onto an endless conveyor comprising a pair of laterally spaced sprocket chains 25 and transverse crank rods 26. As shown, there is one of these crank rods 26 provided for each transversely aligned pair of links in the sprocket chains 25 and their ends are loosely journaled in said links at their longitudinal centers and above their vertical centers.

The sprocket chains 25 are arranged to run over idle lower sprocket wheels 27 and driven upper sprocket wheels 28, the former of which have trunnions 29 journaled in bearings 30 secured to the frame side bars 10. The upper sprocket wheels 28 are keyed to a shaft 31 journaled in suitable bearings on the frame side bars 10. The endless conveyor, during its return movement, passes under the axle 8 and over guide rollers 32 journaled in bearings 33 on the frame side bars 10.

The crank rods 26 normally hang down and, during the upward travel of the conveyor from the shovel plow 11, their bodies are intermittently brought into engagement with two longitudinal rows of upwardly and rearwardly inclined cam fingers 34, arranged to gradually lift the bodies of said rods and then let the same drop abruptly. These two rows of cam fingers 34 are located under the horizontal flanges of the frame side bars 10 and pivoted at their lower ends to and between parallel bars 35 rigidly secured by brackets 36 to said frame side bars. Formed with the lower ends of the cam fingers 34 are depending arms 37, and each longitudinally aligned set thereof is simultaneously operated and held in different adjustments by a bar 38. The rear ends of the two bars 38 are pivoted to the outer ends of a pair of crank arms 39 secured on an oscillatory shaft 40 journaled in the bars 35. The shaft 40 is oscillated and held in different oscillated positions by a latch lever 41 keyed to the left-hand end of said shaft and a co-operting lock segment 42 secured to the left-hand frame side bar 10. Obviously, by moving the lever 41 forward, the cam fingers 34 may be raised to increase the inclination thereof and, by moving said lever rearward, said cam fingers may be lowered to decrease the inclination thereof.

The forward ends of the bars 35 are curved upwardly and rearwardly to afford guides 43, with which the bodies of the crank rods 26 engage to hold the same away from the sprocket wheels 27 while passing upward thereover. The rear ends of the bars 35 are also curved upwardly, rearwardly and downwardly over the sprockets 28 to afford guides 44, with which the bodies of the crank rods 26 engage to hold the same out of engagement with the sprocket wheels 28 while passing therearound. These guides 44 cause the crank rods 26 to make a complete rotation while passing around the sprocket wheels 28.

The following connections are provided for driving the shaft 31 from the traction wheels 7, towit:—

Secured to the inner face of each traction wheel 7 is a large spur gear 45, which meshes with a spur pinion 46 journaled on a countershaft 47 mounted on bearings on the frame 9. To each pinion 46 is secured, for rotation therewith, a relatively large sprocket wheel 48 alined with a relatively small sprocket wheel 49 loosely journaled on the projecting end of the shaft 31, and having on its inner face a one-way half-clutch member 50, and over each aligned pair of sprocket wheels 48 and 49 runs a sprocket chain 51. Co-operating with each sprocket chain 51 is a half-clutch member 52 keyed to the shaft 31 and yieldingly held in engagement with the co-operating clutch member 50 by a coiled spring 53 encircling the shaft 31 and compressed between the clutch member 52 and a collar 54 secured to the shaft 31 for rotation therewith. The co-operating clutch members 50 and 52 are arranged to drive the shaft 31 from the traction wheels 7 in a direction to cause the upper section of the conveyor to move upward and to slip when the machine is turning a corner.

When the lever 21 is operated to lift the shovel plow 11 out of the ground, the final backward movement thereof automatically throws the clutch members 52 out of engagement with the clutch members 50 by means of shipper levers 55 attached to said lever by a cable 56 and branch cables 57. The shipper levers 55 are intermediately pivoted to brackets 58 on the frame side members 10, and the cable 56 is attached to the arm 23 and its branch cables 57 are attached, one to each of the upper ends of the shipper levers 55. The cable 56 runs under a guide sheave 59 on the beam 14 and between a pair of guide sheaves 60 on a tie-rod 61, which connects a pair of sideboards 62 secured to the frame side bars 10. The branch cables 57 are guided by pin-equipped brackets 63 secured to the sideboards 62.

A skeleton shaker 64 underlies the delivery end of the endless conveyor to receive therefrom the potatoes. This shaker 64 is made up of a multiplicity of rearwardly projecting and laterally spaced rods, the forward ends of which are rigidly secured to a frame 65 having trunnions journaled in the depending brackets 66 on the frame side bars 10. Preferably, as shown, the shaker 64 is concave in cross section to collect the potatoes deposited thereon into its center and deposit the same on the ground in a relatively narrow row.

To vibrate the shaker 64, there are secured to the collars 54 eccentric pins 67 connected by links 68 to the outer ends of a pair of rearwardly projecting arms 69 rigidly secured to the frame 66 at its trunnions. To vary the shaking movement of the shaker 64, the link 68 may be attached to the arms 69 at different longitudinally spaced points by forming in said arms a plurality of holes to receive the pivotal connections of said links. Overlying the shaker 64 is a plurality of laterally spaced rods 70 having their inner ends attached to the frame 65 above the rods of said shaker. These rods 70 are curved rearwardly and laterally to receive thereon potato vines, weeds and the like carried upward on the conveyor and deposit the same on the ground at one side of the dug potatoes.

From the above description, it is evident that the dirt delivered onto the conveyor from the shovel plow 11 will be precipitated through the conveyor onto the ground under the movement of the crank rods 26 in passing over the cam fingers 34. The potatoes, except very small ones, will be carried upward on the crank rods 26 and deposited on the shaker 64 and, under the shaking movement thereof, will be worked backward and into the center of said shaker and then deposited on the loose dirt precipitated through the conveyor. The vines, weeds and the like, deposited on the rods 70 from the conveyor, are under the shaking movement thereof, worked backward and laterally, and deposited on the ground in a row on one side of the dug potatoes. As previously stated, the movement of the crank rods 26 may be varied, at will, by changing the inclination of the cam fingers 34. The shaking movement of the shaker 64 and rods 70 may also be varied, at will, by shifting the links 67 in the various different holes formed in the arms 69.

What we claim is:—

1. A conveyer adapted to receive potatoes and earth from the plow of a potato digger having in combination spaced link chains, rods extending between said chains and pivoted to the links thereof by eccentric pivots to depend freely therefrom, and means for oscillating said rods about said pivots during the travel of the chain comprising a row of rearwardly extending spaced cam fingers disposed at each side of the conveyor adjacent said channels.

2. A conveyer adapted to receive potatoes from the plow of a potato digger having in combination spaced link chains, rods extending between said chains and having their ends pivoted to the inner sides of said links thereof by eccentric pivots whereby the links depend between said chains, and undersides of the means for continuously oscillating said rods about the eccentric pivots during the travel of the chain.

3. A conveyer for a potato digger having in combination spaced link chains, transverse rods extending between said chains and having their ends pivoted to said links by eccentric pivots to depend freely between said chains, means for continuously oscillating said rods about said pivots the movement of adjacent rods being dissimilar.

4. The structure set forth in claim 1, said fingers having cam surfaces of sufficient length to simultaneously support a plurality of said rods.

5. A conveyor adapted to receive potatoes and earth from the plow, of a potato digger having in combination, spaced link chains, rods extending between said chains and eccentrically pivoted at each end to the links of said chains, means for oscillating said rods about said pivots during the travel of the chain comprising rows of spaced cam fingers at each side of the conveyor adjacent said chains, a frame in which all of said fingers are pivoted, and means for simultaneously swinging all of said fingers to different positions and holding them in the desired position.

6. A conveyor adapted to receive material from a potato digger having in combination spaced link chains, rods extending between said chains and pivoted to the links thereof by eccentric pivots, means for oscillating said rods about said pivots during the travel of the chain comprising rows of spaced upwardly inclined cam fingers disposed adjacent each chain, a frame to which said fingers are pivoted, said fingers having portions projecting below their pivots, means pivotally connecting all of said portions, and means for swinging said last mentioned means to simultaneously adjust the inclination of all of said fingers and hold the same in adjusted position.

7. A conveyor for a potato digger having in combination, a pair of spaced link chains, a series of spaced rods extending transversely between said chains and eccentrically pivoted thereto normally to depend therebetween, and a series of spaced upwardly inclined fingers disposed closely adjacent the inner side of said links over which the rods move in the travel of the chain and by which they are oscillated about their eccentric pivots.

8. A conveyor for handling potatoes and earth in a potato digger having in combination, spaced link chains, rods extending between the chains and eccentrically pivoted thereto, and spaced means disposed at each side of the conveyor adjacent the chains oscillating said rods about their pivots during the travel of the chains.

9 A conveyer for a potato digger having in combination, a pair of parallel spaced link chains, a series of spaced rods extending between said chains and disposed entirely below the tops of said links, said rods having their ends bent to extend parallel with and offset to their main central portions, said ends being journaled in said links, and means adjacent the chains for engaging and swinging said rods about their ends.

In testimony whereof we affix our signatures in presence of two witnesses.

JOSEPH J. KOVAR.
JOHN R. KOVAR.

Witnesses as to Joseph J. Kovar:
  CARL K. BENNETT,
  A. A. SCHUSTER.

Witnesses as to John R. Kovar:
  L. H. COLSON,
  G. C. CLEMENT.